Patented June 17, 1952

2,600,379

UNITED STATES PATENT OFFICE 2,600,379

SUPPORTED GROUP VIII-CARBON DEHYDROGENATION CATALYST

Thomas F. Doumani and Roland F. Deering, Los Angeles, Calif., assignors to Union Oil Company of California, Los Angeles, Calif., a corporation of California No Drawing. Application November 9, 1945, Serial No. 627,796

7 Claims. (Cl. 252—446)

The present invention relates to the dehydrogenation of hydrocarbons, and particularly to catalysts therefor. This is a continuation-in-part of copending application S. N. 431,274, filed on February 17, 1942, now U. S. Patent No. 2,402,740.

Catalysts which have been known to benefit the dehydrogenation of ethyl benzene to styrene, for example, include many of the difficultly reducible oxides such as those of calcium, lithium, strontium, magnesium and beryllium. Also, the easily reducible metal oxides or compounds admixed with difficultly reducible metal oxides have been employed. However, the catalytic life of some of these catalysts is relatively short, apparently due to reduction of the oxide to the free metal, which appears to exert a harmful effect on such catalysts, in causing excessive cracking of the feed stock. The process, therefore, requires frequent regeneration of the catalyst. Also, the products produced when employing such catalysts are frequently contaminated with products of deleterious side reactions, which products are difficultly removable from the styrene. Similar difficulties are encountered in other dehydrogenation reactions, such as the dehydrogenation of non-aromatic hydrocarbons to olefins or diolefins, or the conversion of non-aromatic type hydrocarbons to aromatic hydrocarbons by dehydrogenation with or without cyclization.

It is an object of our invention to supply for the above reactions catalysts which are easily prepared, have unusual activity, have long life, and require relatively infrequent regeneration.

Another object is to employ these catalysts in the above reactions.

Other objects of the invention will be apparent to those skilled in the art from the following description:

We have discovered that certain catalysts containing carbon and certain metals, such as nickel, the oxides of which are easily reducible, not only increase the reaction rate to a large extent in dehydrogenation reactions such as converting ethylbenzene to styrene, but maintain their catalytic activity at a high level for a considerably longer time than in the case of the heretofore known catalysts. For example, we have found that a catalyst composed of a relatively inert support containing from 1% or less, up to about 20% of metallic nickel together with carbon in minor proportions is particularly effective for dehydrogenating ethylbenzene to produce a relatively high yield of styrene which may be recovered from the products in substantially pure form. This result is largely unexpected in view of the prior knowledge that nickel on such supports as alumina results in the decomposition of the ethylbenzene into toluene and methane.

The carbon-containing catalyst forming the subject matter of our invention may be used as such or may be employed on a porous relatively inactive support such as broken brick, tile, carbon, alumina gel, silica gel, clays, zeolites, and the like. In general, when employing a support for the catalyst, the support is impregnated with the metallic salt, dried, and the salt is decomposed with heat to the oxide. Carbon is then deposited on the impregnated support by decomposing a hydrocarbon gas at elevated temperatures in the presence of the support containing the oxide and allowing the carbon produced by the decomposition to deposit on the support. The metal oxide is then reduced to the metal by contacting it with hydrogen at temperatures above about 300° C. (about 500° F.). The reduction of the metal oxide to the metal may also precede the carbon deposition, tho the former method is preferred.

The dehydrogenation processes of this invention in which the above catalysts are employed in general involve subjecting the vapors of the feed stock to temperatures between about 300° and 800° C. in the presence of the above catalysts, and at relatively low pressures such as below about 15 atmospheres and preferably though not necessarily, in the presence of added hydrogen. Steam or other inert diluent gas may also be employed.

The dehydrogenation of alkylated aromatic hydrocarbons to form styrene and like compounds is generally carried out by placing the catalyst in a suitable reaction chamber and passing the vapors of the hydrocarbon to be dehydrogenated together with steam through the reaction chamber maintained at elevated temperatures of about 400° to 800° C. (about 800° F. to 1600° F.), preferably about 500° to 700° C. (about 900° F. to 1300° F.) and pressures of as low as 10 millimeters absolute to five atmospheres.

The products leaving the reaction chamber will generally consist of the styrene or analogue or homologue thereof, depending upon the charging stock, together with unreacted hydrocarbons, water and hydrogen. By cooling and condensing the products leaving the reaction chamber, the condensable liquids may be separated from the hydrogen and the former may be separated by stratification and decantation into an oily layer and water. The dehydrogenated desired product may be removed from the unreacted or unconverted hydrocarbon in a well known manner such as by distillation and/or cooling of the styrene to crystallize it and then filtering off the crystallized styrene.

The dehydrogenation of non-aromatic hydrocarbons to form olefins or diolefins may be carried out at temperatures which are somewhat lower than the temperatures used for the production of styrene and like hydrocarbons described above. Thus, for the dehydrogenation of butane to butene, or butene to butadiene, or ethylene to acetylene, or ethylene to butadiene, or cyclohexane to cyclohexene, and similar reactions, temperatures preferably between about 300° and 500° C. are employed, together with relatively low pressures and steam or other inert diluent as above.

The dehydrogenation of non-aromatic hydrocarbons to form aromatic hydrocarbons is the main reaction involved in the process known commercially as hydroforming, or catalytic reforming in the presence of hydrogen. In this process, the vapors of the feed stock are subjected to elevated temperatures preferably in the region of about 400° to 600° C. in the presence of hydrogen. Besides simple dehydrogenation of naphthenes such as cyclohexane to aromatics such as benzene, other reactions take place such as cyclization and isomerization, but there is an overall dehydrogenation, with production of hydrogen. The catalysts of this invention are especially suitable for this process.

The invention may perhaps be best understood by reference to the following examples, which are merely illustrative of the invention and are not to be taken as limiting the invention.

*Example 1*

A carbon-nickel catalyst was prepared as follows:

Commercial diatomaceous earth of 12-20 mesh was impregnated with a nickelous nitrate solution, dried at 400° F. (about 200° C.) and heated at 900° F. (about 500° C.) to produce a mixture of diatomaceous earth containing 18% by weight of nickel as nickel oxide. This mixture was then placed in the reaction tube and ethylene gas was passed through the catalyst bed at about 900° F. (500° C.) which resulted in decomposing the ethylene to carbon which was deposited on the catalyst in a very finely divided and soot-like state. The hydrogen produced by the decomposition was removed from the reaction chamber and then additional hydrogen at 900° F. (500° C.) was passed through the catalyst bed to completely reduce the nickel oxide to metallic nickel. The catalyst bed was thus composed of about 150 ml. of a mixture consisting of approximately 18% nickel, 5% carbon and the remainder diatomaceous earth.

Approximately 26 ml. of ethylbenzene and 29 grams of steam at 600° F. (315° C.) were passed through the reactor which was maintained at about 1200° F. (650° C.) This required about 109 minutes. The oily product leaving the reactor was collected and was found to contain approximately 56% by weight of styrene.

*Example 2*

Broken pieces of porous fire brick of about one inch at their largest diameter were impregnated with an aqueous solution of nickelous nitrate. The material was then placed in a reactor tube where they are dried at 400° F. (200° C.) and then heated at 900° F. (500° C.) to produce masses of broken brick containing about 8% by weight of nickel as nickel oxide. The uncondensed cracking still gases obtained from the cracking of gas oil and consisting essentially of methane, ethane, ethylene, propane and propylene were passed through the reactor which was maintained at about 1300° F. (700° C.). This resulted in decomposing some of the gases to deposit a finely divided carbon on the porous brick and nickel oxide. Hydrogen was then passed through the reactor at about 1300° F. (700° C.) which resulted in completely reducing the nickel oxide to metallic nickel. The catalyst bed was thus composed of the broken brick containing about 8% by weight of metallic nickel and about 9% of the carbon.

Vaporized ethylbenzene and steam were passed through the reactor containing the above catalyst and the products of reaction were separated and collected as in the previous example. The oily layer was found to contain approximately 85% styrene.

*Example 3*

About 700 ml. (330 g.) of 10 to 30 mesh commercial hydrated silica was immersed in 1114 g. of nickel nitrate solution containing 12.9% nickel by weight at room temperature for about one hour, whereby a portion of the aqueous solution was adsorbed thereon. The remaining solution was decanted from the solid granules, and the latter were dried for about sixteen hours at about 115° C., and further heated for about six hours at about 425° C., to produce a product consisting of nickel oxide impregnated on silica, the amount being about 12% by weight calculated as nickel.

Two portions of the above product were taken for further work. One portion was subjected to reduction only as described below, and the other was subjected to reduction followed by carbon deposition. The reduction was accomplished by heating the material to a temperature of about 630° C., and passing hydrogen gas over it at a rate of about 300 volumes (calculated at standard conditions) per volume of catalyst per hour for about three-fourths hour. The carbon deposition was accomplished by maintaining the so-treated material at the same temperature and atmospheric pressure while passing ethylene gas over it at a rate of about 300 to 900 volumes per volume of catalyst per hour for about one hour.

The finished catalyst prepared as above, which was found to consist of about 11.5% of nickel and 5% carbon on the silica support, was employed in a catalytic reforming operation in the presence of hydrogen, carried out as follows:

About 75 ml. of catalyst was maintained in a reaction tube at a temperature of about 510° C. and a pressure of about 7 atmospheres, while about 40 liters per hour of hydrogen gas (corrected to standard conditions, i. e. one atmosphere pressure and 0° C. temperature) and about 75 ml./ hour of hydrocarbon feed (measured as liquid at room temperature) were passed over it. Thus the feed rate was one V/V (volumes of liquid feed per volume of catalyst per hour) and the hydrogen ratio was about 3 MCF/B (thousands of cubic feet of barrel of liquid feed). The feed employed was a straight-run fraction obtained from a Texas crude oil, and had a boiling range of about 220° F. to 260° F. and an aromatic hydrocarbon content of about 14% by weight. The product obtained during the first four hours of operation under the above conditions had an increased aromatic hydrocarbon content, the yield of this product being about 74% of the feed (by weight). To show the effect of the carbon on the activity of this catalyst, the above run was repeated, using the portion of the nickel-oxide impregnated silica which was not subjected to carbon deposition but merely to reduction with hydrogen as described above. In this case the aromatic hydrocarbon content of the product was only 14%, and the yield of the product was only 67% by weight of the feed.

*Example 4*

A commercial granular activated alumina was impregnated with cobalt nitrate solution and dried in a similar manner to that used in Example 3 above. The product was treated with cracking still gases as in Example 2 so as to deposit carbon thereon, and reduce with hydrogen to obtain a catalyst containing about 10% cobalt, 1% carbon and the remainder alumina. This catalyst was employed for catalytic reforming in the presence of hydrogen as in Example 3 above, and a 50% yield of a product containing 40% aromatic hydrocarbons was obtained.

*Example 5*

A commercial granular bauxite was impregnated with platinic chloride solution, dried, heated in an air oven to form the oxide, subjected to carbon deposition with ethylene at 700° C., and finally reduced with hydrogen to obtain a catalyst containing about 0.01% Pt and about 0.1% carbon on the bauxite carrier. This catalyst was used to dehydrogenate butene to butadiene by passing two liters per hour of mixed butenes and 4 liters per hour of steam over 5 ml. of catalyst at a temperature of 600° C. and atmospheric pressure. An excellent yield of butadiene was obtained.

In another somewhat similar type of reaction, the above catalyst and process were employed with an ethylene feed stock, and substantial yields of acetylene and butadiene were obtained.

As noted previously, the above examples are merely illustrative and not limiting. Thus while in the foregoing Examples 1 and 2, we have disclosed the conversion of ethylbenzene to styrene, it will be observed that by similar procedure, other alkylated aromatic hydrocarbons such as diethylbenzene, isopropylbenzene, di-isopropylbenzene, ethyltoluene, p-cymene, ethylchlorobenzene, the corresponding naphthalene derivatives, etc. may be converted or dehydrogenated to produce corresponding homologues and analogues of styrene.

Similarly, in Examples 3 and 4, we have disclosed aromatization of a specific petroleum fraction under specific conditions. However, the catalysts of this invention are also extremely useful for the dehydrogenation of other non-aromatic hydrocarbons, especially normally liquid petroleum fractions, and particularly those boiling in any range between about 50° C. and 250° C., so as to increase their aromatic hydrocarbon content. In this process temperatures between about 300° and 800° C. are used, preferably about 400° C. to 600° C., together with pressures between about 0.1 and 15 atmospheres, preferably about 2 to 10 atmospheres. Hydrogen need not necessarily be used, but preferably is used, especially in quantities such as about 1 to 10 MCF/B. Feed rates between about 0.1 and 10 V/V may be used, so as to provide sufficient time of contact to accomplish the desired dehydrogenation.

In the dehydrogenation of non-aromatic hydrocarbons to form olefins or diolefins, using the catalysts of this invention, other conditions than those shown in Example 5 may be employed with the catalyst of this invention. In general, temperatures between about 300° and 800° C. may be used, preferably about 400° to 700° C., together with total pressures below 15 atmospheres, preferably about atmospheric or below. Partial pressures of hydrocarbon feed between about 0.01 and 1 atmosphere are preferred. The diluent gas used to supply any difference between the partial pressure and the total pressure is preferably steam, but other inert gases such as nitrogen or flue gas may be used. The feed rate is adjusted to provide the degree of dehydrogenation desired. In this manner the normally gaseous hydrocarbons containing 2 to 4 carbon atoms such as ethane, ethylene, propane, propylene, butanes, butenes, and mixtures of these; or normally liquid hydrocarbons, whether acyclic such as amylenes, hexanes, heptenes, octanes, octenes, cetane and the like, or cyclic such as cyclohexane, cyclopentane, cyclohexenes, dimethyl cyclopentane, ethyl cyclohexane and the like, may be dehydrogenated.

As noted above, the preferred catalysts of this invention are those which contain minor proportions of carbon and a free metal on a porous relatively inert support, and are prepared by impregnating the support with an aqueous solution of a salt of the desired metal, drying and decomposing the adsorbed salt to form the oxide, and following this by the steps of carbon deposition and reduction of the oxide to the metal with hydrogen, these steps being carried out in either order. The metals used in these catalysts are preferably the Group 8 metals, which include the iron group, iron, cobalt, and nickel, and the noble metals ruthenium, rhodium, palladium, osmium, iridium, and platinum. The Group 1B metals may also be employed, i. e., copper, silver, and gold.

It has also been found that the steps of carbon deposition and reduction with hydrogen are beneficial when applied to similar catalysts containing other catalytic metals or even oxides of the metals of Groups 2B, 3B, 4B, 5B, 6B, and 7B of the Mendeleeff periodic table. If the Bohr periodic table is used, particularly the modification referred to by Luder in "An Improved Periodic Table" published in the Journal of Chemical Education vol. 16, p. 393 and 394 (August 1939) it will be observed that these, together with the Group 1B and Group 8 metals previously referred to, constitute the four "transitional series" of "The Related Metals" which have their differentiating electron, not in the outer shell, as with sodium, magnesium, and the like "Representative Elements," but in the second from the outermost shell. The members of each series generally differ by one atomic number. Thus the members of the first transitional series are those having atomic numbers 21 to 30, i. e., Sc, Ti, V, Cr, Mn, Fe, Co, Ni, Cu and Zn; the members of the second transitional series are those having atomic numbers 39 to 48, i. e., Yt, Zr, Cb, Mo, Ma, Ru, Rh, Pd, Ag, and Cd; those of the third transitional series have atomic numbers 57 to 80 i. e., La, Hf, Ta, W, Re, Os, Ir, Pt, Au, and Hg; and those of the fourth transitional group which are known have atomic numbers 89 to 92, and include Ac, Th, Ux and U. Thus catalysts of this invention may be prepared by impregnating a porous relatively inert carrier or support with an aqueous solution of a salt of a metal of the first, second, third or fourth transitional groups (preferably the first and second), drying and decomposing the adsorbed salt to form the oxide, and following this by the steps of carbon deposition and reduction with hydrogen, the latter steps being carried out in either order but preferably having the reduction follow the carbon deposition.

The amount of metal to be included in the catalyst may be regulated by adjusting the concentration of the salt solution, the amount used, the time, and the degree of adsorption permitted in the impregnation step. This should be controlled so that the finished catalyst will contain only a minor proportion of the metal (whether in its free state or in the form of an oxide) usually less than 20% of the metal being sufficient. It has been found that in some instances very small amounts of metal may be employed such as one-thousandth to one-tenth of one per cent based on the finished catalyst, as illustrated in Example 5 above.

The amount of carbon in the finished catalyst may be controlled by control of the temperature of the carbon deposition reaction, the pressure, and the amount of hydrocarbon decomposed in the carbon deposition reaction. Only minor proportions of carbon in the finished catalyst are necessary, generally less than 10% and in many instances mere traces of carbon such as about one hundredth to one tenth of one per cent and up to one per cent are effective. For the carbon deposition step temperatures in excess of about 400° C. are necessary, with pressures about atmospheric or higher, allowing sufficient time of contact to decompose a major proportion of the hydrocarbon employed. The hydrocarbon employed for the carbon deposition reaction is preferably a gaseous olefin, ethylene being especially suitable although propylene and even butenes may be employed as well as saturated hydrocarbons having less than about five carbon atoms, and mixtures thereof. Just why this type of carbon deposition is so beneficial for purposes of these catalysts is not known.

The reduction with hydrogen should be carried out at a temperature greater than about 300° C. and preferably between about 500° C. and 800° C., for a sufficient time to accomplish the reduction desired.

It has also been found that the beneficial effect of carbon is evidenced, to a somewhat lesser degree however, if carbon itself is employed as the carrier, and the aqueous solution of the metal salt is impregnated thereon and the resulting solid is dried, heated to decompose the adsorbed salt to its oxide and reduced with hydrogen as above. Carbons which may be used in this manner include wood, vegetable, and nut shell charcoals, carbons obtained from the decomposition of petroleum hydrocarbons such as petroleum coke, asphalt, lamp black, etc. As an example of such a catalyst and its use, a commercial nutshell carbon and having a 20–40 mesh was impregnated with a water solution of nickelous nitrate

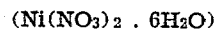
$(Ni(NO_3)_2 \cdot 6H_2O)$ and then dried at a temperature of 400° F. followed by heating in a current of hydrogen at 1200° F. This resulted in first decomposing the nickelous nitrate to nickel oxide and then reducing the oxide to metallic nickel. The resulting catalyst was composed of the charcoal containing about 1% by weight of metallic nickel. In the above preparation of the catalyst, it has been found convenient to dissolve the requisite amount of the nickel salt in such a volume of water that the entire solution is adsorbed by the carbon-containing material. In place of the nickelous nitrate, other nickel salts may be employed such as the carbonates and other salts which are decomposable to the metal oxide upon heating.

Approximately 150 ml. of the thus prepared catalyst was placed in a reaction tube. Ethylbenzene was vaporized and preheated to about 500° F. and about 22 ml. of the ethylbenzene vapors and 105 grams of steam at 500° F. were passed in a steady flow through the reaction maintained at about 1200° F. This required about 60 minutes to pass the mixture of ethylbenzene and steam through the reaction zone. The mixture consisting of styrene, unreacted ethylbenzene, water and hydrogen leaving the reactor was condensed by passing the vapors through a suitable condenser which condensed the styrene, ethylbenzene and water leaving a gaseous mixture consisting essentially of hydrogen which was allowed to escape to the atmosphere. The condensate was allowed to stratify into an upper oily layer and a lower aqueous layer which were separated from each other by decantation. The oily layer was analyzed and was found to contain approximately 40% by weight of styrene.

Using the same catalyst and conditions as in the above example, but employing a feed consisting of 20% ethylbenzene and 80% mixed xylenes the process gave a reaction product in which 68% of the ethylbenzene was dehydrogenated to styrene.

Another form of dehydrogenation process to which the present catalysts are applicable is the dehydrogenation of alcohols to form aldehydes or ketones. Thus isopropyl alcohol may be dehydrogenated to form acetone; secondary butyl alcohol may be dehydrogenated to methyl ethyl ketone; primary butyl alcohol may be dehydrogenated to form butyraldehyde; and the like. The conditions of operation required for such conversion are approximately the same as those required for the other dehydrogenation reactions described above. For the purposes of this invention, this process may be included in the term dehydrogenation of hydrocarbons.

Other modifications of this invention which would be obvious to one skilled in the art are to be considered within the scope of the invention as defined in the following claims.

We claim:

1. A catalyst for the dehydrogenation of hydrocarbons which consists essentially of a major proportion of a porous inactive supporting material and minor proportions of carbon and a free Group VIII metal, said catalyst having been prepared by a process comprising impregnating on said supporting material an aqueous solution of a salt of said metal, heating the impregnated supporting material to convert the adsorbed salt to the oxide and following this by the steps of carbon deposition by decomposition of ethylene thereon prior to use, and reduction to the free metal with hydrogen at an elevated temperature, said carbon deposition having been carried out at a temperature in excess of 400° C. for a sufficient time to decompose a major proportion of the ethylene.

2. A catalyst according to claim 1 in which the metal is nickel.

3. A catalyst according to claim 1 in which the metal is cobalt.

4. A catalyst according to claim 1 in which the metal is platinum.

5. A catalyst according to claim 1 in which the metal comprises 0.001 to 0.1% of the catalyst, and the carbon comprises 0.01 to 0.1% of the catalyst.

6. A catalyst according to claim 1 in which the metal salt is nickel nitrate.

7. A catalyst according to claim 1 in which the supporting material is essentially silica.

THOMAS F. DOUMANI.
ROLAND F. DEERING.

REFERENCES CITED

The following references are of record in the file of this patent:

UNITED STATES PATENTS

| Number | Name | Date |
|---|---|---|
| 1,999,573 | Odell | Apr. 30, 1935 |
| 2,166,266 | Schmidt | July 18, 1939 |
| 2,365,029 | Voorhies | Dec. 12, 1944 |
| 2,370,797 | Kearby | Mar. 6, 1945 |
| 2,377,512 | Page, Jr. | June 5, 1945 |
| 2,387,088 | Oblad et al. | Oct. 16, 1945 |
| 2,400,012 | Littmann | May 7, 1946 |
| 2,425,754 | Murphree et al. | Aug. 19, 1947 |